(12) United States Patent
Watanabe et al.

(10) Patent No.: US 6,729,122 B2
(45) Date of Patent: May 4, 2004

(54) EXHAUST GAS PURIFICATION SYSTEM OF INTERNAL COMBUSTION ENGINES

(75) Inventors: Norihito Watanabe, Wako (JP); Kenji Abe, Wako (JP); Yasuyuki Miyahara, Wako (JP); Masao Komine, Wako (JP); Kenichi Ohmori, Wako (JP); Tadashi Sato, Wako (JP); Takashi Haga, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/235,887

(22) Filed: Sep. 6, 2002

(65) Prior Publication Data

US 2003/0046926 A1 Mar. 13, 2003

(30) Foreign Application Priority Data

Sep. 7, 2001 (JP) ........................................ 2001-272171
Sep. 7, 2001 (JP) ........................................ 2001-272172

(51) Int. Cl.$^7$ ............................................... F02M 25/06
(52) U.S. Cl. .......................................... 60/278; 60/287
(58) Field of Search ........................ 60/278, 288, 292, 60/297, 287

(56) References Cited

U.S. PATENT DOCUMENTS

| 3,823,556 | A | * | 7/1974 | Goto et al. | .................... | 60/288 |
| 5,396,764 | A | * | 3/1995 | Rao et al. | ...................... | 60/274 |
| 5,946,906 | A | * | 9/1999 | Akazaki et al. | ............... | 60/278 |
| 6,141,961 | A | * | 11/2000 | Rinckel | ........................ | 60/288 |
| 6,477,830 | B2 | * | 11/2002 | Takakura et al. | ............. | 60/277 |
| 6,588,203 | B2 | * | 7/2003 | Hirota et al. | .................. | 60/297 |

FOREIGN PATENT DOCUMENTS

| JP | 50(1975)-20129 | 3/1975 |
| JP | 2-275043 | 11/1990 |
| JP | 7-33875 | 8/1995 |
| JP | 08071427 | 3/1996 |
| JP | 10-153112 | 6/1998 |
| JP | 10159544 | 6/1998 |
| JP | 2001-200720 | 7/2001 |

* cited by examiner

Primary Examiner—Thomas Denion
Assistant Examiner—Diem Tran
(74) Attorney, Agent, or Firm—Armstrong, Kratz, Quintos, Hanson & Brooks, LLP.

(57) ABSTRACT

An exhaust gas purification system of internal combustion engine having a branch pipe coupled to the exhaust pipe through a flange and having a first cylindrical case constituting a bypass exhaust gas passage and a second cylindrical case constituting a main exhaust gas passage, whose flow are switched by a switch-over valve by selectively connecting the exhaust pipe to the main exhaust gas passage or the bypass exhaust gas passage, and an adsorbent installed in the bypass exhaust gas passage for adsorbing unburned components of the exhaust gas. The unburned exhaust gas components are recirculated to the air intake system through an EGR pipe. In the system, an inlet of the EGR pipe is formed integrally with the branch pipe flange, thereby enabling to prevent increase in fabrication step and cost and further to facilitate maintenance. Moreover, the first cylindrical case is made displace relative to the second cylindrical case. This can prevent the deformation due to the thermal stress which could occur when they are different in temperature.

10 Claims, 9 Drawing Sheets

EXHAUST GAS PURIFICATION SYSTEM OF INTERNAL COMBUSTION ENGINES

BACKGROUND OF THE INVENTION

1. Field of the Invention

This invention relates to an exhaust gas purification system of internal combustion engines.

2. Description of the Related Art

Internal combustion engines are ordinarily provided with a catalytic converter comprising a three-way catalyst in the exhaust system which removes HC, NOx and CO components in the exhaust gas generated by the engine. However, when the catalytic converter is not activated, for example, at the time of engine cold-starting, unburned components of the exhaust gas including unburned HC are released immediately into the atmosphere.

For that reason, as taught by Japanese Laid-Open Patent Application No. Hei 10 (1998)-153112, there has been proposed an exhaust gas purification system which has an adsorbent made of a zeolite material or some similar material installed in a bypass exhaust gas passage branched from the exhaust pipe at a location downstream of the catalytic converter, which again merges into the exhaust pipe at a downstream point, and a switch-over valve to be controlled to open or close the bypass exhaust gas passage. The switch-over valve is controlled to open the bypass exhaust gas passage when the catalytic converter has not been activated at cold engine start to introduce the exhaust gas such that the adsorbent adsorbs unburned components and to close the bypass exhaust gas passage such that the adsorbed components desorb from the adsorbed components.

The desorbed components are thereafter recirculated at a position upstream of the catalytic converter, e.g. to the air intake system, through an EGR passage after the catalytic converter has been activated. It is also known to provide an ordinary catalytic converter at the bypass exhaust gas passage to improve catalytic purification efficiency, as is disclosed in Japanese Laid-Open Patent Application No. Sho 50-20129.

As is disclosed in Japanese Laid-Open Patent Application No. 2001-200720, such an EGR passage is constituted as a pipe which extends from the air intake system to the bypass exhaust gas passage. The structure of the EGR passage disclosed in this prior art ('720) requires another pipe for forming an inlet which is to be penetrated through a case (constituting the bypass exhaust gas passage) and joined to there. This increases steps of fabrication and cost. Further, the possibility of leakage increases as the number of joints increases.

Moreover, this configuration makes it difficult to remove the exhaust gas purification system from the branch pipe (and the upstream exhaust pipe coupled to the branch pipe through flange, and is disadvantageous in maintenance.

Aside from the above, in such a kind of exhaust gas purification system, as is disclosed in the aforesaid prior art reference ('112), the exhaust pipe (constituting a main exhaust gas passage) and the case (constituting the bypass exhaust gas passage) are joined and fixed together at both ends in upstream and downstream locations (in the sense of exhaust gas stream). Since, however, the exhaust gas is regulated to flow one of the exhaust pipe and the chamber alternatively, it is preferable to avoid deformation or distortion due to thermal stress which could occur when the pipe and the chamber are different in temperature.

SUMMARY OF THE INVENTION

A first object of the invention is therefore to provide an exhaust gas purification system of internal combustion engines having a recirculation pipe that recirculates unburned exhaust gas components desorbed from an adsorbent installed in a bypass exhaust gas passage to a location upstream of the catalytic converter, which is configured to have a simplified structure of the recirculation pipe inlet for the bypass exhaust gas passage.

A second object of the invention is therefore to provide an exhaust gas purification system of internal combustion engines having a main exhaust gas passage and a bypass exhaust gas passage storing an exhaust gas purifier, which is configured to avoid deformation or distortion due to thermal stress which could occur when the passages are different in temperature.

In order to achieve the first object, the present invention provides a system for purifying exhaust gas of an internal combustion engine having an exhaust pipe for discharging exhaust gas generated by the engine to exterior of the engine through a catalytic converter, a branch pipe coupled to the exhaust pipe through a flange at a location downstream of the catalytic converter and having a main exhaust gas passage and a bypass exhaust gas passage, a switch-over valve for selectively connecting the exhaust pipe to the main exhaust gas passage or the bypass exhaust gas passage, an adsorbent installed in the bypass exhaust gas passage for adsorbing unburned components of the exhaust gas, and a recirculation pipe for recirculates the exhaust gas including the unburned components at a location upstream of the catalytic converter; wherein the improvement comprises; an inlet of the recirculation pipe for introducing the recirculated gas is formed integrally with the branch pipe flange.

In order to achieve the second object, the present invention provides a system for purifying exhaust gas of an internal combustion engine having a bypass exhaust gas passage storing an exhaust gas purifier, the bypass exhaust gas passage branching from an exhaust pipe for discharging the exhaust gas generated by the engine and merging into the exhaust pipe at a location downstream of the exhaust gas purifier through a main exhaust gas passage connecting to the exhaust pipe, comprising; a first case constituting the bypass exhaust gas passage; and a second case constituting the main exhaust gas passage; wherein: the first case and the second case are configured in such a way that one is displaceable relative to other.

BRIEF DESCRIPTION OF THE DRAWINGS

The objects and advantages of the invention will be made apparent with reference to the following descriptions and drawings, in which.

DETAILED DESCRIPTION OF THE PREFERRED EMBODIMENTS

Embodiments of the invention will now be explained with reference to the drawings.

Figure 1:
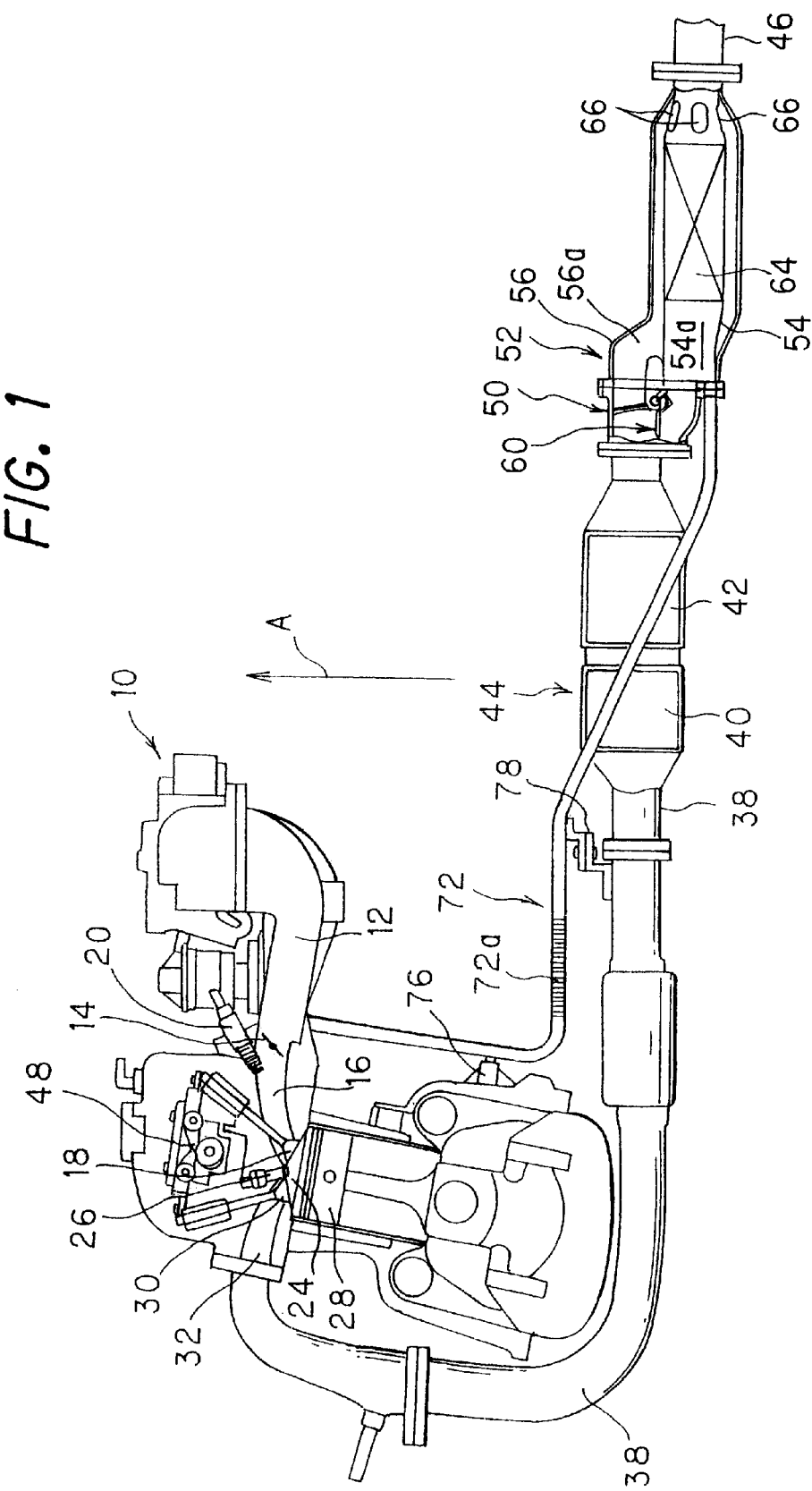
FIG. 1 is a schematic side view showing the overall configuration of an exhaust gas purification system of internal combustion engines according to a first embodiment of the invention.

FIG. 1 is a view schematically showing the overall configuration of an exhaust gas purification system of internal combustion engines according to an embodiment of the invention. In FIG. 1, the arrow A indicates the axis of gravity.

Reference numeral 10 in this figure designates an overhead cam (OHC) in-line four-cylinder internal combustion engine. Air drawn into an air intake pipe or passage 12 through an air cleaner (not shown) is adjusted in its flow rate by a throttle valve 14 and is supplied to the first to fourth cylinders (only one is shown) through an intake manifold 16 and two intake valves 18 (only one is shown).

A fuel injector 20 is installed in the vicinity of the intake valves 18 of each cylinder for injecting fuel into the cylinder concerned. The injected fuel mixes with the intake air to form an air-fuel mixture that is supplied into a combustion chamber 24 and is compressed in the compression stroke. The compressed air-fuel mixture is then ignited by a spark plug 26. The resulting combustion of the air-fuel mixture drives a piston 28 downwards in the figure.

The exhaust gas generated by the combustion is discharged through two exhaust valves 30 (only one is shown) into an exhaust manifold 32, from where it passes through an exhaust pipe or passage 38 to a first three-way catalyst bed and a second three-way catalyst bed 42. The first and second three-way catalyst beds 40 and 42 are installed below the floor of vehicle (not shown) on which the engine 10 is mounted and constitute a catalytic converter 44 where noxious components in the exhaust gas are removed therefrom whereafter the exhaust gas is discharged into the atmosphere via a vehicle rear assembly including a muffler and a tail pipe (neither shown; reference numeral 46 designates only a part of the rear assembly).

The engine 10 is equipped with a variable valve timing mechanism 48, which switches the opening/closing timing of the intake and/or exhaust valves between two types of timing characteristics in response to the engine operating conditions. However, since its operation is described in, for example, Japanese Laid-Open Patent Application 2 (1990)-275043, no further explanation will be made.

The exhaust pipe 38 is flange-coupled to a switch-over valve body 50 at a location downstream of the catalytic converter 44, and the switch-over valve body 50 is flange-coupled to a branch pipe 52.

Figure 2:
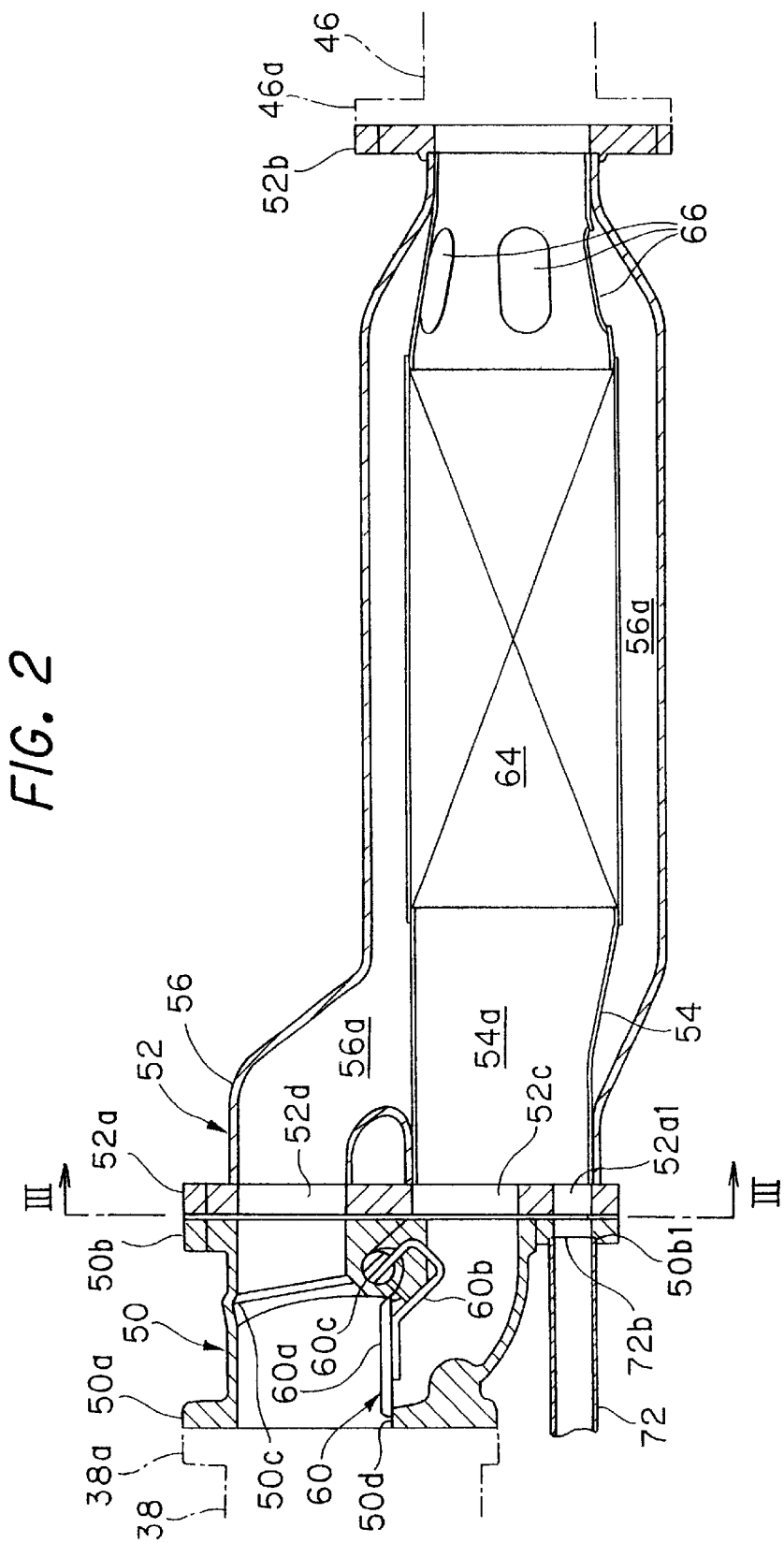
FIG. 2 is an enlarged cross-sectional view of the switch-over valve body and the branch pipe illustrated in FIG. 1.
Figure 3:
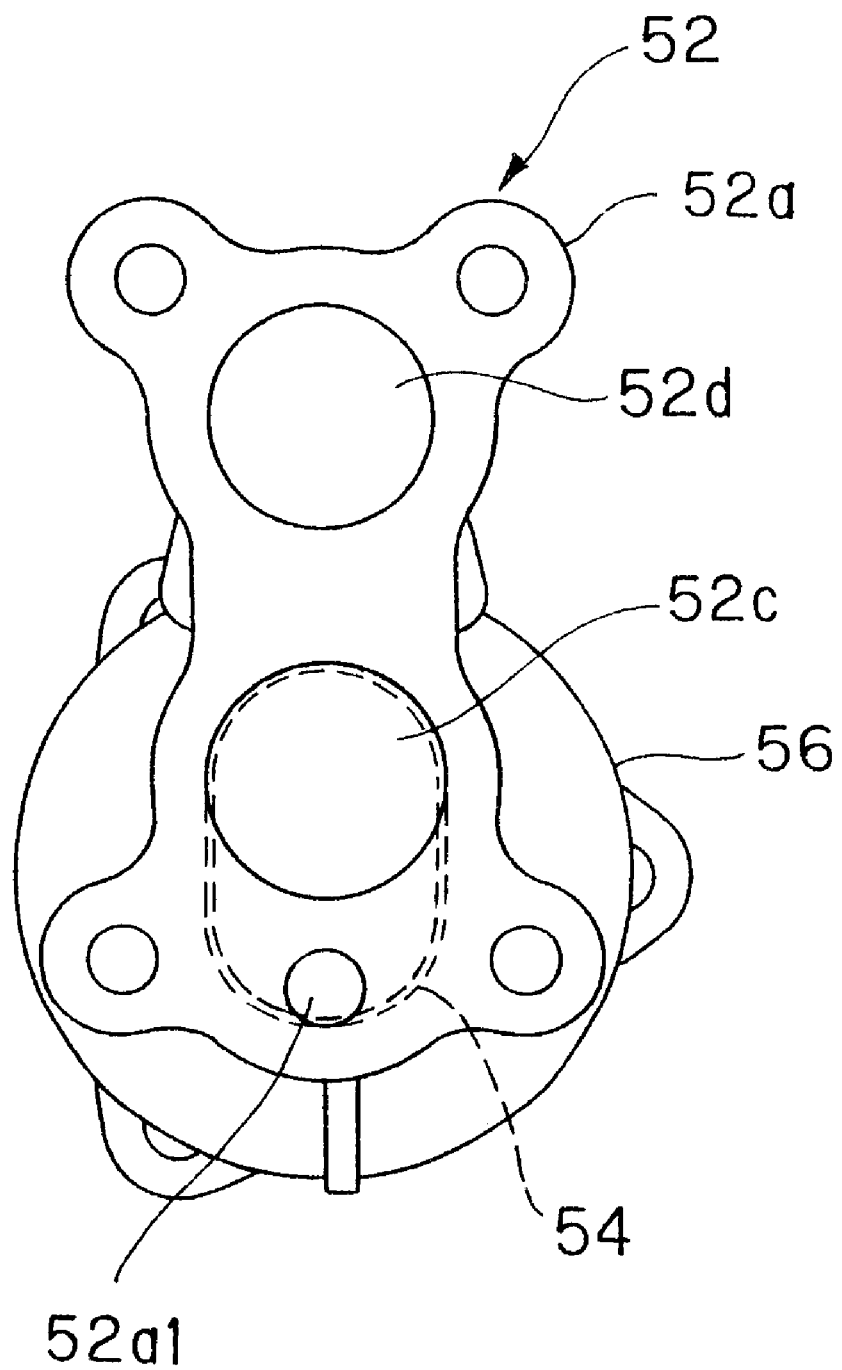
FIG. 3 is a cross-sectional view taken along III—III of FIG. 2.

FIG. 2 is an enlarged cross-sectional view of the switch-over valve body 50 and the branch pipe 52, and FIG. 3 is a cross-sectional view taken along III—III of FIG. 2.

As illustrated in FIG. 2, the exhaust pipe 38 and the switch-over valve body 50 are made separate or independent from each other, and are joined together by bolting their flanges 38a and 50a. Similarly, the switch-over valve body 50 and the branch pipe 52 are made separate or independent from each other, and are joined together by bolting their flanges 50b and 52a. Further, the branch pipe 52 and the vehicle rear assembly 46 are joined together by bolting their flanges 52b and 46a.

The branch pipe 52 has the structure as shown in FIG. 2. Specifically, the branch pipe 52 has a first cylindrical case 54 which starts from an inlet 52c (also shown in FIG. 3) and extends throughout the center of the branch pipe 52, and a second cylindrical case 56 which starts from an inlet 52d (also shown in FIG. 3) and extends around the first cylindrical case 54. As shown in FIG. 3, the second cylindrical case 56 has a diameter larger than that of the first cylindrical case 54. Although not explicitly shown, the second cylindrical case 56 has an annular passage (in cross-section) that encloses the first cylindrical case 54. The first cylindrical case 54 and the second cylindrical case 56 are made of a metallic material.

The first and second cylindrical cases 54, 56 are each fixed (joined) through an airtight joint to the flange 52a around the openings each defining the inlets 52c and 52d. As shown in FIG. 3, the first cylindrical case 54 is configured to be elliptic or oval (in cross-section) at a location where the case 54 is joined to the flange 52a.

The switch-over valve body 50 is connected, at one end, to the first cylindrical case 54 to form the inlet 52c and is connected, at the other end, to the second cylindrical case 56 to form the inlet 52d. With this, downstream of the switch-over valve body 50, there are formed a main exhaust gas passage 56a extending through the annular passage of the second cylindrical case 56, and a bypass exhaust gas passage 54a extending through the circular space formed in the first cylindrical case 54. The combustion gas exhausted from the combustion chamber 24 flows through one of the two exhaust gas passages 54a and 56a.

The switch-over valve body 50 houses a switch-over valve 60 which comprises a first valve disc 60a, an arm 60b in inverted-C shape and a shaft 60c connected to the disc 60a by the shaft 60c. The shaft 60c is connected to a valve actuator (not shown) which is connected to the air intake pipe 12 at a location downstream of the throttle valve 14, through a passage (not shown) for introducing the negative pressure therefrom.

An electromagnetic solenoid valve (referred to as "TRPV", but not shown) is installed in the passage, which opens the passage, when energized, to introduce the negative pressure therein. With this, the valve disc 60a is moved or rotated from the position shown in FIG. 2 to rest on a first valve seat 50c of the switch-over valve body 50a and closes the second cylindrical case 56 (main exhaust gas passage 56a).

On the other hand, when the TRPV is deenergized and the passage is opened to the air, the valve disc 60a is returned to the position shown in FIG. 2 by a return spring (not shown) to rest on a second valve seat 50d of the switch-over valve body 50 and closes the first cylindrical case 54 (bypass exhaust gas passage 54a).

An adsorbent (HC adsorbing catalyst; exhaust gas purifier) 64 is installed at the bypass exhaust gas passage 54a in the first cylindrical case 54. Specifically, as shown in FIG. 3, the adsorbent 64 is in the same shape as the bypass exhaust gas passage 54a and is housed and stored in the first cylindrical case 54. Thus, the adsorbent 64 stored in the first cylindrical case 54 is in thermal contact with the second cylindrical case 56 which extending from the exhaust pipe 38 and encircles the first cylindrical case 54, so as to promote the adsorbent temperature increase such that the adsorbed unburned components are desorbed as quickly as possible and are then recirculated into the engine intake system at a location upstream of the catalytic converter 44.

The adsorbent 64 comprises a mixture of crystalline silicate (e.g., zeolite), as described in Japanese Laid-Open Patent Application No. Hei 8 (1996)-71427 proposed by the assignee. More specifically, the adsorbent 64 comprises a mixture of various types of zeolite including Y-type, Ga-MFI and ferrierite, and is carried on a honeycomb structure made of a spiral thin metal plate as taught in Japanese Utility Model Publication Hei 7 (1995)-33875.

The mixture of the crystalline silicate exhibits an excellent heat proof (thermal stability) property at a high temperature of 900° C. to 1000° C., compared with active carbon, etc. The adsorbent 64 made of this material adsorbs unburned HC components at a low temperature less than 100° C. and desorbs the adsorbed HC component at a higher temperature ranging from 100° C. to 250° C. The temperature of adsorption or desorption is different for different kinds or types of the adsorbent.

The first cylindrical case 54 is provided at a location downstream of the adsorbent 64 (close to the vehicle rear assembly 46), with five holes (confluence points) 66 which are circumferentially located at intervals of 72 degrees. The bypass exhaust gas passage 54a is thus connected and merged with the main exhaust gas passage 56a through the five holes 66. At a location downstream of the five holes 66, the first cylindrical case 54 is fixed and fastened to the flange 52b through an airtight joint around an opening through which the exhaust gas flows to the vehicle rear assembly 46. Similarly, the second cylindrical case 56 is also fixed and fastened to the flange 50b through an airtight joint around the first cylindrical case 54.

Returning to the explanation of FIG. 1, the first cylindrical case 54 (constituting the bypass exhaust gas passage 54a) is connected, at or near the entrance (at a position close to the switch-over valve body 50) to an EGR (Exhaust Gas Recirculation) pipe 72. The EGR pipe 72 is fastened to the body of the engine 10 by a support 76 which projects from the cylinder case, and is fastened to the exhaust pipe 38 by a stay 78. Then, the EGR pipe 72 descends gradually or evenly, passing the side of the catalytic converter 44, towards the first cylindrical case 54 and is finally connected to the case 54 at a relatively lower portion (in terms of the axis of gravity A).

The EGR pipe 72 has a bellows-like or corrugated portion 72a at its midway, more precisely at a position just downstream of the bending portion (in terms of recirculated gas flow), which allows the EGR pipe 72 to expand or contract in response to the expansion or contraction of the exhaust pipe 38 due to the exhaust gas heat. In the structure illustrated, the EGR pipe 72 is connected between the body of the engine 10 and the branch pipe 52 which is connected to the body of the vehicle frame, in other words, the EGR pipe 72 is connected to these members which are different in vibration system. The bellows-like portion 72a can also function to absorb the vibration difference therebetween.

As illustrated in FIG. 2, an inlet 72b of the EGR pipe 72 (i.e., the distal end of the EGR pipe 72) is partially force-fitted or press-fitted into a hole 50b1 formed at the flange 50b of the switch-over valve body 50. In other words, the inlet 72b of the EGR pipe 72 is formed integrally with the flange 50b of the switch-over valve body 50.

At the side of the branch pipe 52 adjacent to the switch-over valve 50, the first cylindrical case 54 is fixed and fastened to the flange 52a around the opening defining the inlet 50c through an airtight joint. Similarly, the second cylindrical case 56 is fixed and fastened to the flange 52a through an airtight joint around the opening defining the inlet 50d.

Further, the flange 52a has a hole 52a1 formed in alignment with the EGR pipe inlet 72b (and the hole 50b1) in such a manner that the EGR pipe 72 communicates with the inside of the first cylindrical case 54 through the hole 52a1 to connect the bypass exhaust gas passage 54a to the air intake pipe 12 at a position downstream of the throttle valve 14. Thus, it could be said that the inlet 72b of the EGR pipe 72 is formed integrally with the flange 52a of the branch pipe 52.

An EGR control valve made of electromagnetic solenoid valve (not shown) is installed in the EGR pipe 72 at an appropriate location, which opens the EGR pipe 72 when energized, to connect the first cylindrical case 54 (constituting the bypass exhaust gas passage 54a) to the air intake pipe 12.

Briefly explaining the operation of the exhaust gas purification system illustrated in FIG. 1, when the catalytic converter 44 has not been activated immediately after the engine 10 was started, the first cylindrical case 54 (constituting the bypass exhaust gas passage 54a) is opened, while the second cylindrical case 56 (constituting the main exhaust gas passage 56a) is closed, to introduce the exhaust gas to the bypass exhaust gas passage 54a such that the adsorbent 64 adsorbs unburned components including HC. The rest of the exhaust gas is discharged into the atmosphere via the vehicle rear assembly 46.

Then, when the catalytic converter 44 become activated, the first cylindrical case 54 is closed, while the second cylindrical case 56 is opened, such that the exhaust gas flows the main exhaust gas passage 56a to the exterior of the engine 10. The exhaust gas flowing through the main exhaust gas 56a heats the adsorbent 64 whereafter the adsorbed unburned components begins desorbing.

Then, when the engine operation allows to conduct the EGR, the EGR control valve is energized to connect the first cylindrical case 54 (constituting the bypass exhaust gas passage 54a) to the air pipe 12 such that the desorbed unburned components trapped in the bypass exhaust gas passage 54a are recirculated into the air intake system at a position upstream of the catalytic converter 44. During the EGR, a part of the exhaust gas flowing the main exhaust gas passage 56a enters the bypass exhaust gas passage 54a through the holes 66 to promote the desorption and recirculation of the unburned component.

Having been configured in the foregoing manner, in the exhaust gas purification system of internal combustion engines according to the embodiment, it becomes no longer necessary to prepare another pipe for forming an inlet which is to be penetrated through the first cylindrical case 54 and welded there, thereby enabling to prevent the increase in fabrication step and cost and further to lower the possibility of leakage.

Further, since the inlet 72b of the EGR pipe 72 is formed at the flange 50a of the switch-over valve body 50 in such a way that the inlet 72b communicates with the hole 52a1 formed at the flange 52a of the branch pipe 52, the branch pipe 52 (having the cylindrical case 54 and the second cylindrical case 54) can be easily removed from the switchover valve body 50 (and the upstream portion of the exhaust pipe 38 coupled by a flange 38a), thereby enabling to facilitate maintenance.

Figure 4:
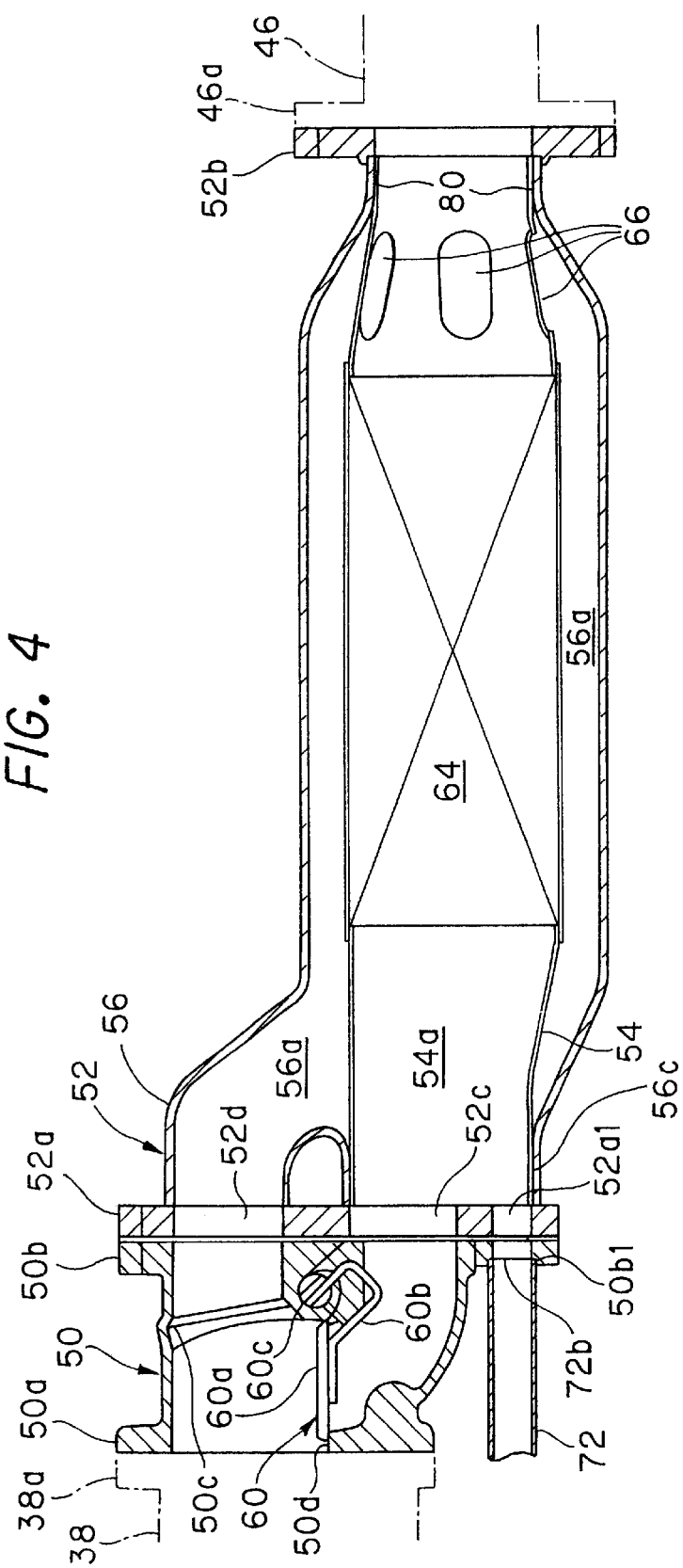
FIG. 4 is a view, similar to FIG. 2, but showing the configuration of the exhaust gas purification system of internal combustion engines according to a second embodiment of the invention.

FIG. 4 is a view, similar to FIG. 2, but showing the configuration of the exhaust gas purification system of internal combustion engines according to a second embodiment of the invention.

Focusing on the difference from the exhaust gas purification system according to the first embodiment, the system according to the second embodiment will be explained.

What is different from the first embodiment is that, in the system according to the second embodiment, the first and second cylindrical cases 54 and 56 are fixed and fastened to the branch pipe 52 at one end of an upstream location or a downstream location (in the sense of exhaust gas flow) and are made displaceable from each other at the other end of the locations.

Specifically, in the system according to the second embodiment, the first cylindrical case 54 is fixed and fastened to the upstream flange 52a of the branch pipe 52 through an airtight joint, while the second cylindrical case 56 is fixed and fastened to the upstream and downstream flanges 52a and 52b of the branch pipe 52 thrugh an airtight joint.

More specifically, in the second embodiment, the first and second cylindrical cases 54 and 56 are fixed and fastened to the branch pipe 52 at the upstream end (indicated by reference numeral 56c in FIG. 4), but are made displaceable to each other at the downstream end, i.e., the first cylindrical case 54 is made displaceable relative to the second cylindrical case 56 at the downstream end.

This will be explained in detail with reference to FIGS. 5A and 5B.

Figure 5A:
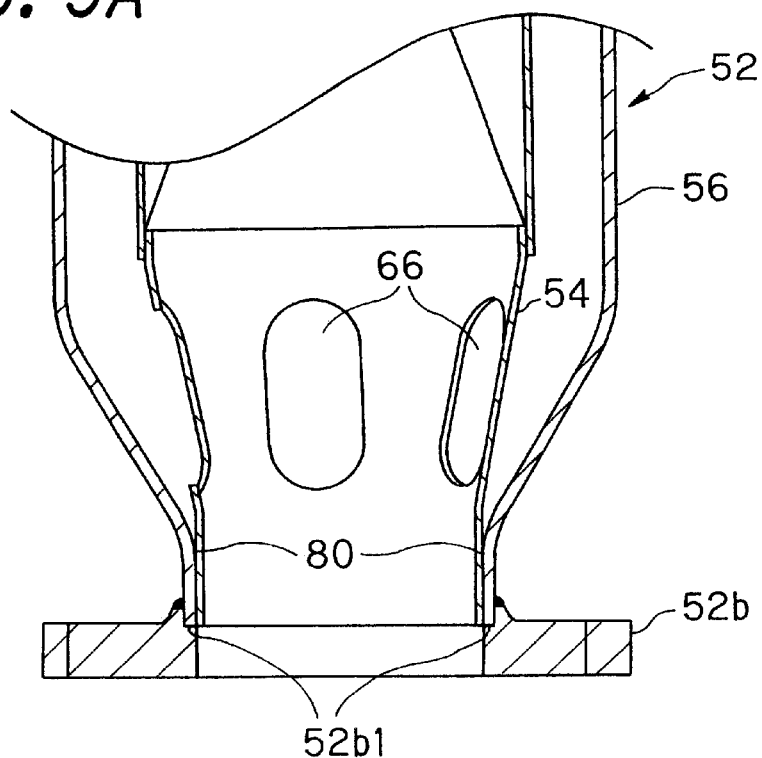
FIGS. 5A and 5B are set of enlarged cross-sectional views showing a detailed configuration of the branch pipe illustrated in FIG. 4.
Figure 5B:
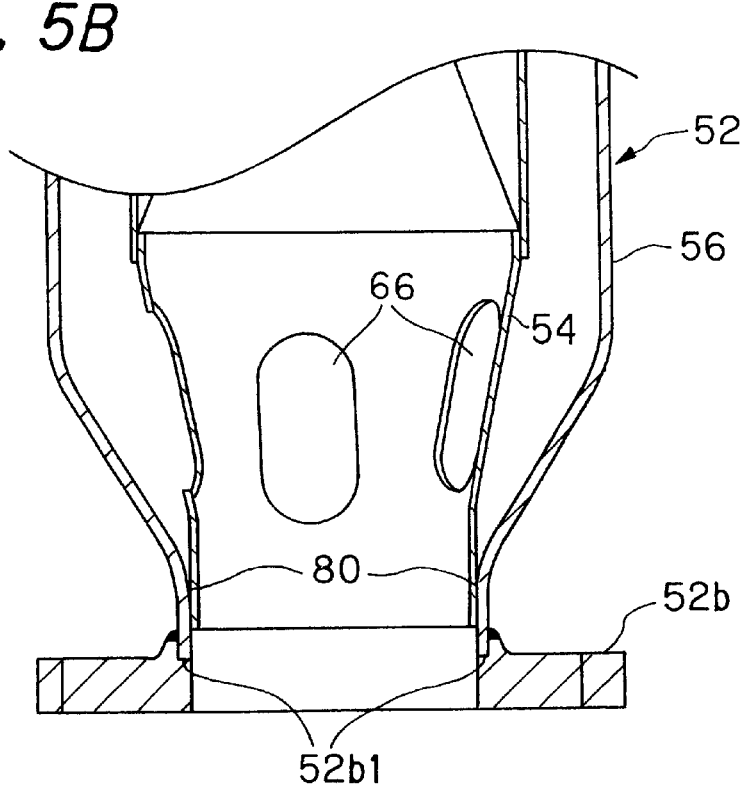

FIGS. 5A and 5B are set of enlarged cross-sectional views showing a detailed configuration of the branch pipe 52.

FIG. 5A shows a situation where the first cylindrical case 54 expands (i.e., displaces relative to the second cylindrical case 56), and FIG. 5B shows a situation where the first cylindrical case 54 contracts at cold state when the engine 10 is stopped (i.e., in the initial state). When both of the first and second cylindrical cases 54 and 56 expand due to the heat generated by the exhaust gas introduced into the second cylindrical case 56, the displacement of the first cylindrical case 54 would be in-between of the situations illustrated in FIGS. 5A and 5B.

As mentioned above, since the exhaust gas is selectively introduced into one of the first cylindrical case 54 and the second cylindrical case 56, this could make the cases 54, 56 different in temperature and could cause them to expand or contract. When the cases 54, 56 are fixed and fastened to the branch pipe 52 securely like the first embodiment, they could be deformed or distorted due to the thermal stress exerting thereon.

In view of this, in the system according to the second embodiment, as illustrated in FIGS. 5A and 5B, the first cylindrical case 54 is made displaceable relative to the second cylindrical case 56 at the downstream location of the branch pipe 52.

Specifically, there is formed a shoulder portion (recess) 52b1 at the flange 52b of the branch pipe 52, and the end of the second cylindrical case 56 is force-fitted into the shoulder portion 52b1 and welded there. In addition, the first cylindrical case 54 is not fixed or fastened to the second cylindrical case 54 at their ends, but is made displaceable relative to the second cylindrical case 56 along a surface 80, i.e., is brought into contact with the second cylindrical case 56 to be slidable on the second cylindrical case 56. Since the first cylindrical case 54 (and the second cylindrical case 56) is fixed to the upstream flange 52a of the branch pipe 52, the case 54 is thus secured to the flange 52a in a cantilever fashion.

Having been configured in the foregoing manner, in the system according to the second embodiment, the first and second cylindrical cases 54, 56 are fixed and fastened to the branch pipe 52 at the upstream end 56c, while the first cylindrical case 54 is made displaceable relative to the second cylindrical case 56 along the surface 80 at the downstream end. In other words, since the first and second cylindrical cases 54, 56 are not constrained (fixed) with each other, when the temperature difference occurs therebetween, it becomes possible to effectively prevent the deformation or distortion due to the thermal stress from occurring by the case displacement.

Further, since the welding the first cylindrical case 54 to the flange 52b is no longer needed, this can improve the efficiency of fabrication and make the configuration simpler than that in the first embodiment, thereby enabling to lower fabrication cost.

Figure 6A:
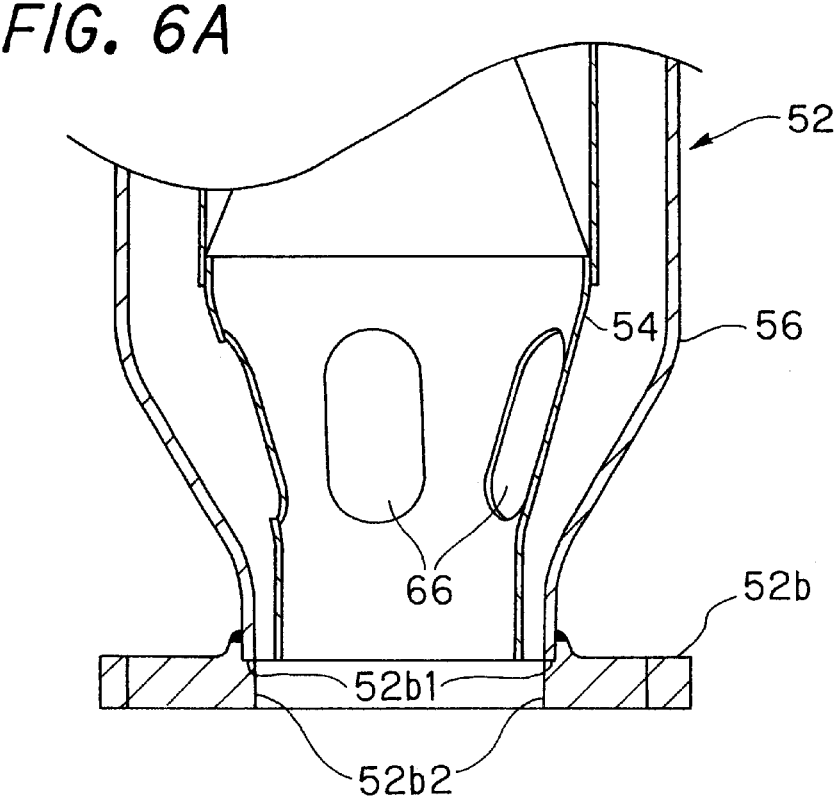
FIGS. 6A and 6B are a set of views, similar to FIGS. 5A and 5B, but showing the exhaust gas purification system of internal combustion engines according to a third embodiment of the invention.
Figure 6B:
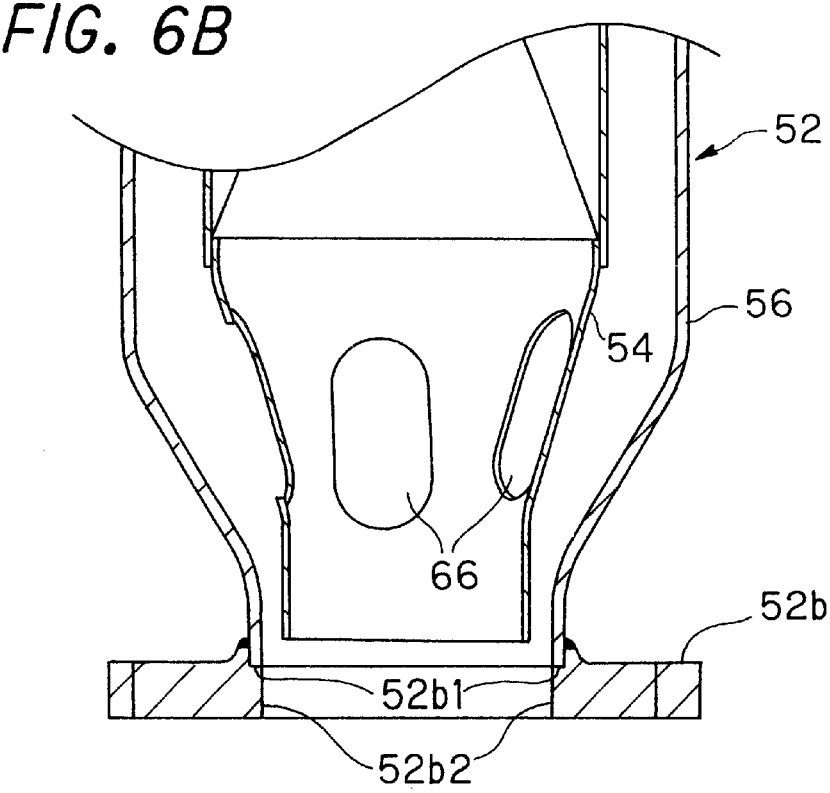

FIGS. 6A and 6B are a set of views, similar to FIGS. 5A and 5B, but showing the exhaust gas purification system of internal combustion engines according to a third embodiment of the invention.

Like FIGS. 5a and 5B, FIG. 6A shows a situation where the first cylindrical case 54 expands, and FIG. 6B shows a situation where the first cylindrical case 54 contracts at cold state when the engine 10 is stopped. When both of the first and second cylindrical cases 54 and 56 expand, the displacement of the first cylindrical case 54 would be in-between of the situations illustrated in FIGS. 6A and 6B.

As illustrated in FIGS. 6A and 6B, in the system according to the third embodiment, the first cylindrical case 54 is made apart from the second cylindrical case 56 in such a way that the first cylindrical case 54 is made displaceable relative to the second cylindrical case 56 at the downstream end of the branch pipe 52, keeping a certain gap therebetween.

Specifically, like the second embodiment, the end of the second cylindrical case 56 is force-fitted into the shoulder portion 52b1 and welded there. In the third embodiment, however, the end of the first cylinder case 54 is configured to be separated from the opening (now indicated by reference numeral 52b2) by a certain distance such that the case 54 is made displaceable relative to the second cylindrical case 56, by a certain gap therebetween.

Having been configured in the foregoing manner, in the system according to the third embodiment, in addition to the effects mentioned with reference to the second embodiment, since the case can be fabricated in less accurate size, the efficiency of fabrication can further be improved.

Figure 7A:
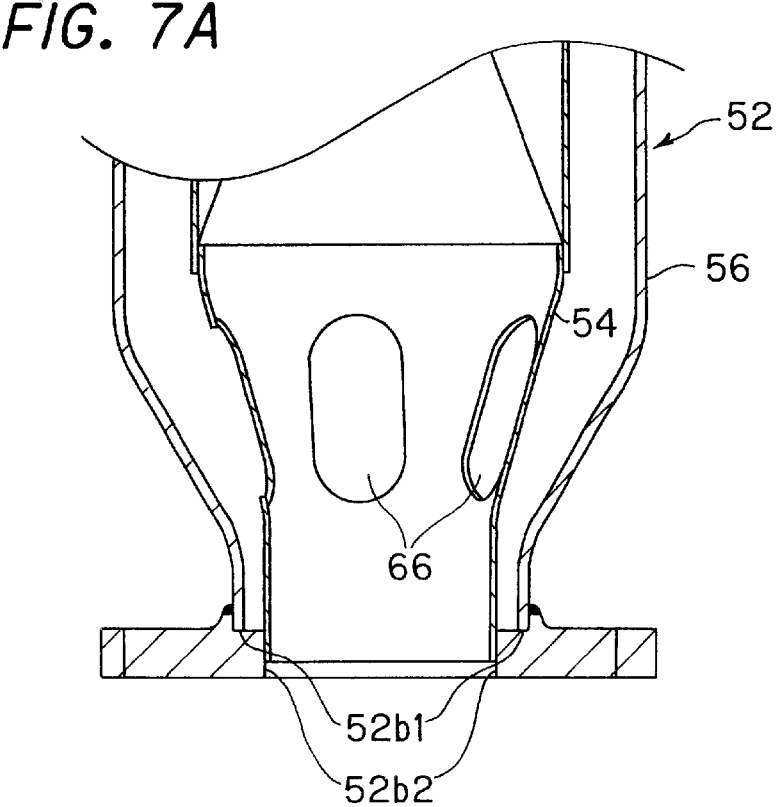
FIGS. 7A and 7B are a set of views, similar to FIGS. 5A and 5B, but showing the exhaust gas purification system of internal combustion engines according to a fourth embodiment of the invention.
Figure 7B:
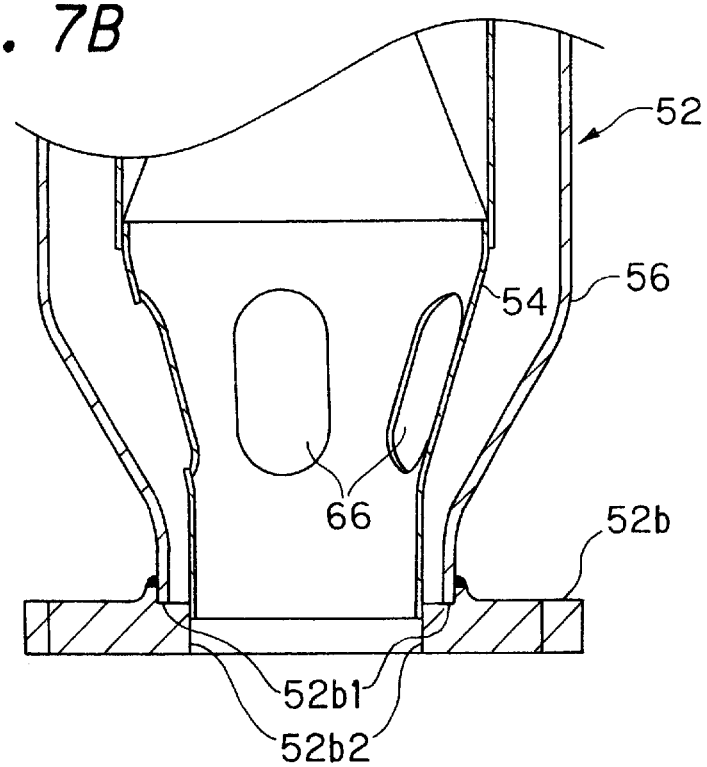

FIGS. 7A and 7B are a set of views, similar to FIGS. 5A and 5B, but showing the exhaust gas purification system of internal combustion engines according to a fourth embodiment of the invention.

Like FIGS. 5a and 5B, FIG. 7A shows a situation where the first cylindrical case 54 expands, and FIG. 7B shows a situation where the first cylindrical case 54 contracts at cold state when the engine 10 is stopped. When both of the first and second cylindrical cases 54 and 56 expand, the displacement of the first cylindrical case 54 would be in-between of the situations illustrated in FIGS. 7A and 7B.

As illustrated in FIGS. 7A and 7B, in the system according to the fourth embodiment, the first cylindrical case 54 is also made displaceable relative to the second cylindrical case 56 at the downstream location of the branch pipe 52, with a gap.

Specifically, in the fourth embodiment, the opening 52$b$2 is formed at a location apart from the shoulder portion 52$b$1 by a certain distance in such a way that the first cylinder case 54 is made slidable on the opening 52$b$2 such that the case 54 is made displaceable relative to the second cylindrical case 56, keeping a certain gap therebetween.

Having been configured in the foregoing manner, when compared with the system according to the third embodiment, the system according to the fourth embodiment can prevent the first cylindrical case 54 from moving in a direction perpendicular to the direction of exhaust gas flow. The rest of the effects are the same as the third embodiment.

Figure 8A:
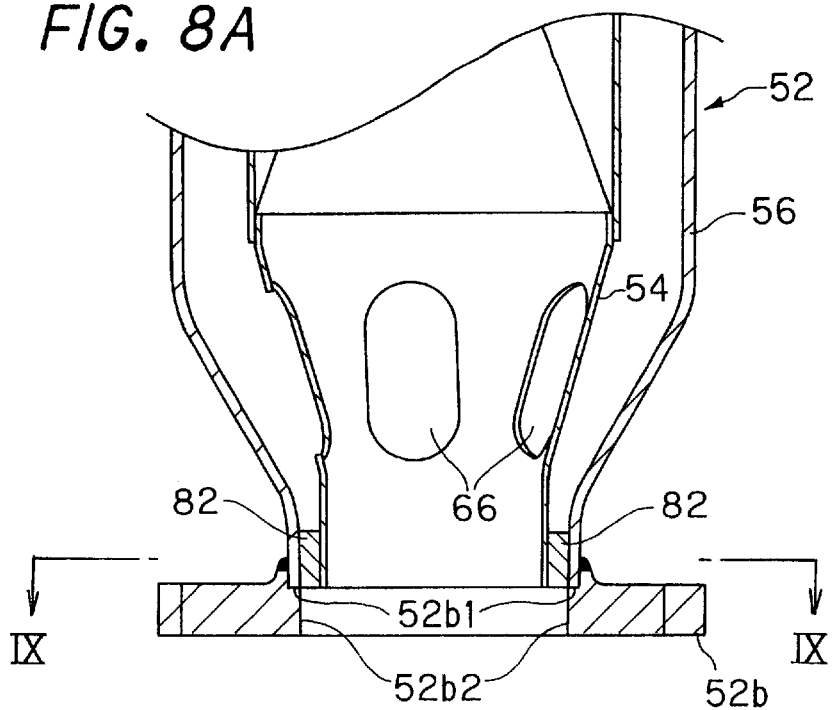
FIGS. 8A and 8B are a set of views, similar to FIGS. 5A and 5B, but showing the exhaust gas purification system of internal combustion engines according to a fifth embodiment of the invention.
Figure 8B:
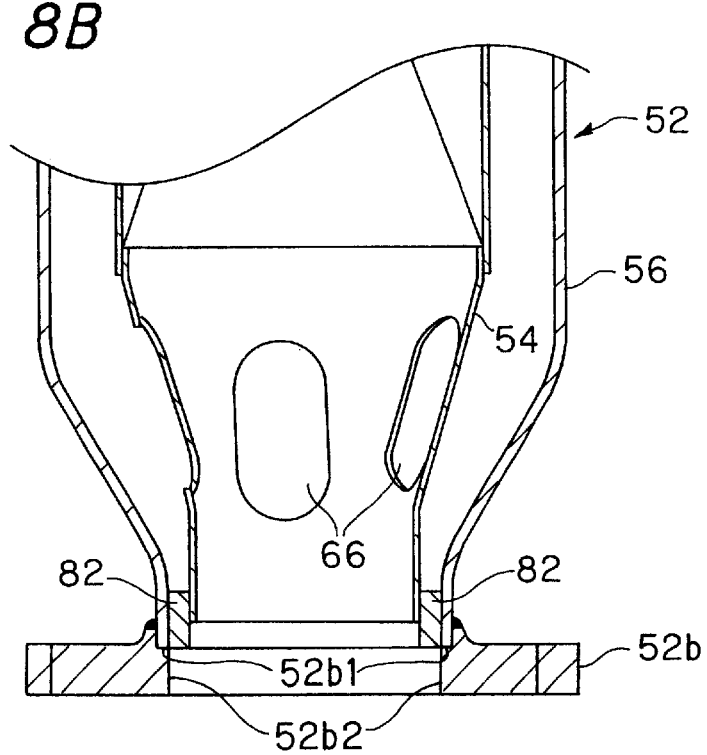
Figure 9:
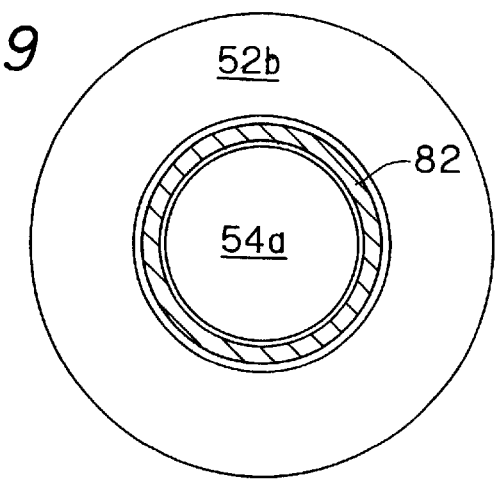
FIG. 9 is a cross-sectional view taken along IX—IX of FIG. 8A.

FIGS. 8A and 8B are a set of views, similar to FIGS. 5A and 5B, but showing the exhaust gas purification system of internal combustion engines according to a fifth embodiment of the invention. FIG. 9 is a cross-sectional view taken along IX—IX of FIG. 8A.

Like FIGS. 5$a$ and 5B, FIG. 8A shows a situation where the first cylindrical case 54 expands, and FIG. 8B shows a situation where the first cylindrical case 54 contracts at cold state when the engine 10 is stopped. When both of the first and second cylindrical cases 54 and 56 expand, the displacement of the first cylindrical case 54 would be in-between of the situations illustrated in FIGS. 8A and 8B.

As illustrated in FIGS. 8A and 8B, in the system according to the fifth embodiment, an element 82 (made of a heat-resisting material) is inserted entirely along the inner surface of the opening 52$b$2 in such a way that the first cylinder case 54 is made slidable on the element 82 keeping a certain gap from the opening 52$b$2 such that the case 54 is made displaceable relative to the second cylindrical case 56. The element 82 can be made of any material which exhibits excellent heat proof property such as a metal mesh, a metal mat.

Figure 10:
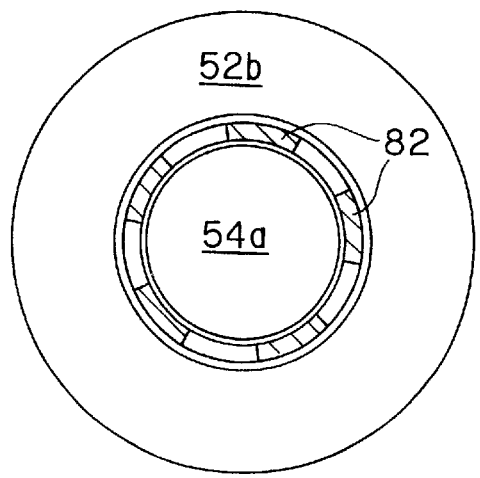
FIG. 10 is a view, similar to FIG. 9, but showing a modification of configuration illustrated in FIG. 9.
Figure 11:
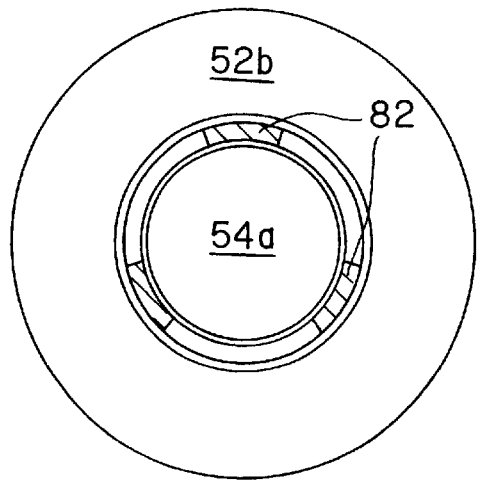
FIG. 11 is a view, similar to FIG. 9, but showing another modification of configuration illustrated in FIG. 9.

FIGS. 10 and 11 are views similar to FIG. 9. As illustrated in the figures, the element 82 can be divided into pieces such as five pieces as shown in FIG. 10 or three pieces as shown in FIG. 11.

Having been configured in the foregoing manner, the system according to the fifth embodiment has the same effects as those of the fourth embodiment.

As mentioned above, the first embodiment is configured to have a system for purifying exhaust gas of an internal combustion engine 10 having an exhaust pipe 38 for discharging exhaust gas generated by the engine to exterior of the engine through a catalytic converter 44, a branch pipe 52 coupled to the exhaust pipe through a flange 52$a$ at a location downstream of the catalytic converter and having a main exhaust gas passage 56$a$ and a bypass exhaust gas passage 54$a$, a switch-over valve 60 for selectively connecting the exhaust pipe to the main exhaust gas passage or the bypass exhaust gas passage, an adsorbent 64 installed in the bypass exhaust gas passage for adsorbing unburned components of the exhaust gas, and a recirculation (EGR) pipe 72 for recirculates the exhaust gas including the unburned components at a location upstream of the catalytic converter, wherein the improvement comprises: an inlet 72B of the recirculation pipe 72 for introducing the recirculated gas is formed integrally with the branch pipe flange 52A.

In the system, the switch-over value 60 is housed in a switch-over valve body 50 which is coupled to the exhaust pipe 38 through a first flange 50$a$ and to the flange 52$a$ of the branch pipe 52 through a second flange 50$b$ having a first hole 50$b$1, and the branch pipe 52 is provided with a second hole 52$a$1 in such a way that a distal end 72 of the recirculation pipe 72 is fixed to the first hole which is mated to the second hole formed at the branch pipe such that the inlet of the recirculation pipe is formed integrally with the branch pipe flange 52$a$.

In the system, the distal end 72$a$ of the recirculation pipe 72 is force-fitted to a portion of the first hole 50$b$1 formed at the second flange 50$b$ of the switch-over valve body 50.

As mentioned above, the second embodiment is configured to have a system for purifying exhaust gas of an internal combustion engine 10 having a bypass exhaust gas passage 54$a$ storing an exhaust gas purifier (adsorbent 64), the bypass exhaust gas passage branching from an exhaust pipe 38 for discharging the exhaust gas generated by the engine and merging into the exhaust pipe at a location downstream of the exhaust gas purifier through a main exhaust gas passage 56$a$ connecting to the exhaust pipe, comprising; a first (cylindrical) case 54 constituting the bypass exhaust gas passage 54$a$; and a second (cylindrical) case 56 constituting the main exhaust gas passage 56$a$; wherein: the first case and the second case are configured in such a way that one is displaceable relative to other.

In the system, the one of the first case 54 and the second case 56 is displaceable relative to the other, while they are brought into contact with each other.

In the system, the one of the first case 54 and the second case 56 is displaceable relative to the other, while they are separated from each other, keeping a gap therebetween.

In the system, the first case 54 and the second case 56 are separated from each other by an element 82.

In the system, the element 82 is divided into pieces.

In the system, the first case 54 and the second case 56 are configured in such a way that one encloses other, and the other is made displaceable to the one.

In the system, the first case 54 and the second case 56 are fixed, at one end, to a member (flange 52$a$ of the branch pipe 52) connected to the exhaust pipe 38 and are made displaceable to each other at other end, and the one end is an upstream end in flow of the exhaust gas.

It should be noted in the above that, although the inlet 72$b$ of the EGR pipe 72 is the distal end of the EGR pipe 72 in the first embodiment, it is alternatively possible to prepare a pipe, independently from the EGR pipe 72, to be detachably attached to the pipe 72 with the use of a thread, for example.

It should also be noted that, although the second cylindrical case 56 is fixed and the first cylindrical case 54 is made displaceable relative to the second cylindrical case 56 in the second embodiment, it is alteratively possible to fix the first cylindrical case 54 such that the second cylindrical case 56 is displaceable relative to the first cylindrical case 54.

It should further be noted that, although the second cylindrical case 56 is fixed at the upstream end and the first cylindrical case 54 is made displaceable relative to the second cylindrical case 56 at the downstream end in the second embodiment, it is alteratively possible to configure that one of the first and second cylindrical cases 54, 56 is fixed at the downstream end and are displaceable to each other at the upstream end.

It should further be noted that, although the second cylindrical case 56 is fixed at the upstream end and the first cylindrical case 54 is made displaceable relative to the second cylindrical case 56 at the downstream end in the second embodiment, it is alteratively possible to configure that the first cylindrical case 54 and the second cylindrical case 56 are made displaceable to each other at both the upstream and downstream ends if the airtightness of the cases are ensured.

It should further be noted that, although the switch-over valve 60 and the connecting point of the EGR pipe 72 are located at the upstream side (close to the catalytic converter 44) in the first and second embodiments, they should not be limited to the location and it is alternatively possible to locate them at the downstream side as disclosed in Japanese Laid-Open Patent Application No. Hei 10 (1998)-159544.

The entire disclosure of Japanese Patent Application Nos. 2001-272171 and 2001-272172 both filed on Sep. 7, 2001, including specification, claims, drawings and summary, is incorporated herein in reference in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for purifying exhaust gas of an internal combustion engine, the system comprising:
    an exhaust pipe for discharging exhaust gas generated by the engine to exterior of the engine through a catalytic converter;
    a branch pipe coupled to the exhaust pipe through a flange at a location downstream of the catalytic converter and having a main exhaust gas passage and a bypass exhaust gas passage;
    a switch-over valve for selectively connecting the exhaust pipe to the main exhaust gas passage or the bypass exhaust gas passage, the switch over valve is housed in a switch-over valve body which is coupled to the exhaust pipe through a first flange and to the flange of the branch pipe through a second flange having a first hole;
    an adsorbent installed in the bypass exhaust gas passage for adsorbing unburned components of the exhaust gas;
    a recirculation pipe for recirculates the exhaust gas including the unburned components at a location upstream of the catalytic converter; and
    an inlet of the recirculation pipe for introducing the recirculated gas is formed integrally with the branch pipe flange;
    and the branch pipe is provided with a second hole in such a way that a distal end of the recirculation pipe is fixed to the first hole which is mated to the second hole formed at the branch pipe such that the inlet of the recirculation pipe is formed integrally with the branch pipe flange.

2. A system according to claim 1, wherein the distal end of the recirculation pipe is force-fitted to a portion of the first hole formed at the second flange of the switch-over valve body.

3. A system for purifying exhaust gas of an internal combustion engine having a bypass exhaust gas passage storing an exhaust gas purifier, the bypass exhaust gas passage branching from an exhaust pipe for discharging the exhaust gas generated by the engine and merging into the exhaust pipe at a location downstream of the exhaust gas purifier through a main exhaust gas passage connecting to the exhaust pipe, comprising;
    a first case corresponding to the bypass exhaust gas passage, the first case having an upstream end and a downstream end, the upstream end of the first case receiving the exhaust gas and being fixed to a member connected to the exhaust pipe, the downstream end outputting the exhaust gas; and
    a second case corresponding to the main exhaust gas passage, the second case having an upstream end and a downstream end, the upstream end of the second case receiving the exhaust gas and being fixed to the member connected to the exhaust pipe, the downstream end outputting the exhaust gas,
    wherein the first case and the second case are configured with the upstream ends of the first and second cases not displaceable relative to each other, and with the downstream ends of the first and second cases displaceable relative to each other.

4. A system according to claim 3, wherein the downstream ends of the first and second cases contact each other.

5. A system according to claim 3, wherein the downstream ends of the first and second cases are separated from each other, keeping a gap therebetween.

6. A system according to claim 5, wherein the downstream ends of the first and second cases are separated from each other by at least one element.

7. A system according to claim 6, wherein the at least one element is divided into pieces.

8. A system according to claim 3, wherein the first case and the second case are configured in such a way that one encloses other.

9. A system according to claim 3, wherein the first case and the second case are displaceable relative to each other at a second end of both the cases, the second end being opposite to the first end.

10. A system according to claim 9, wherein the first end corresponds to the upstream end of both the cases, and the second end corresponds to the downstream end of both the cases.

* * * * *